(12) United States Patent
Borrelli et al.

(10) Patent No.: US 6,596,201 B1
(45) Date of Patent: Jul. 22, 2003

(54) PATTERNING AN OPTICAL PROPERTY ON AN OPTICAL ELEMENT

(75) Inventors: Nicholas F. Borrelli, Elmira, NY (US); Donald M. Trotter, Jr., Newfield, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 330 days.

(21) Appl. No.: 09/607,631

(22) Filed: Jun. 30, 2000

(51) Int. Cl.[7] .......................... F21V 9/14; G02B 27/28; G03F 9/00
(52) U.S. Cl. .......................... 252/585; 252/600; 430/4; 430/5; 359/494
(58) Field of Search ................... 252/585, 600; 430/4, 5; 359/494

(56) References Cited

U.S. PATENT DOCUMENTS

| | | | |
|---|---|---|---|
| 4,225,659 A | * 9/1980 | Drexler | 430/5 |
| 4,551,819 A | * 11/1985 | Michl et al. | 365/120 |
| 4,864,537 A | * 9/1989 | Michl et al. | 365/120 |
| 5,198,912 A | * 3/1993 | Ingwall et al. | 359/494 |
| 5,204,771 A | 4/1993 | Koga | 359/281 |
| 5,208,136 A | * 5/1993 | Zanoni et al. | 430/4 |
| 5,375,012 A | 12/1994 | Borrelli et al. | 359/485 |
| 5,550,654 A | * 8/1996 | Erdogan et al. | 359/494 |
| 5,627,676 A | 5/1997 | Borrelli et al. | 359/494 |
| 5,633,966 A | * 5/1997 | Nakaishi | 430/4 |
| 5,974,205 A | 10/1999 | Chang | 385/11 |
| 6,043,933 A | 3/2000 | Chang | 359/494 |

* cited by examiner

Primary Examiner—Philip Tucker
(74) Attorney, Agent, or Firm—Adenike Adewuya; Timothy Schaeberle

(57) ABSTRACT

A method for patterning an optical property on a optical element that includes selectively applying an energy source to an optical element to pattern an optical property thereon. A method is disclosed where the optical element includes metal halide particles dispersed in the optical element. A method is also disclosed where localized heating includes pre-heating the optical element and heating a small region of the optical element with sufficient energy for metal halide particles to relax in shape. An additional method is disclosed for patterning an optical property on an optical element that includes fusing pieces of optical element containing the optical property with pieces of optical element without the optical property by heat treatment.

27 Claims, 7 Drawing Sheets

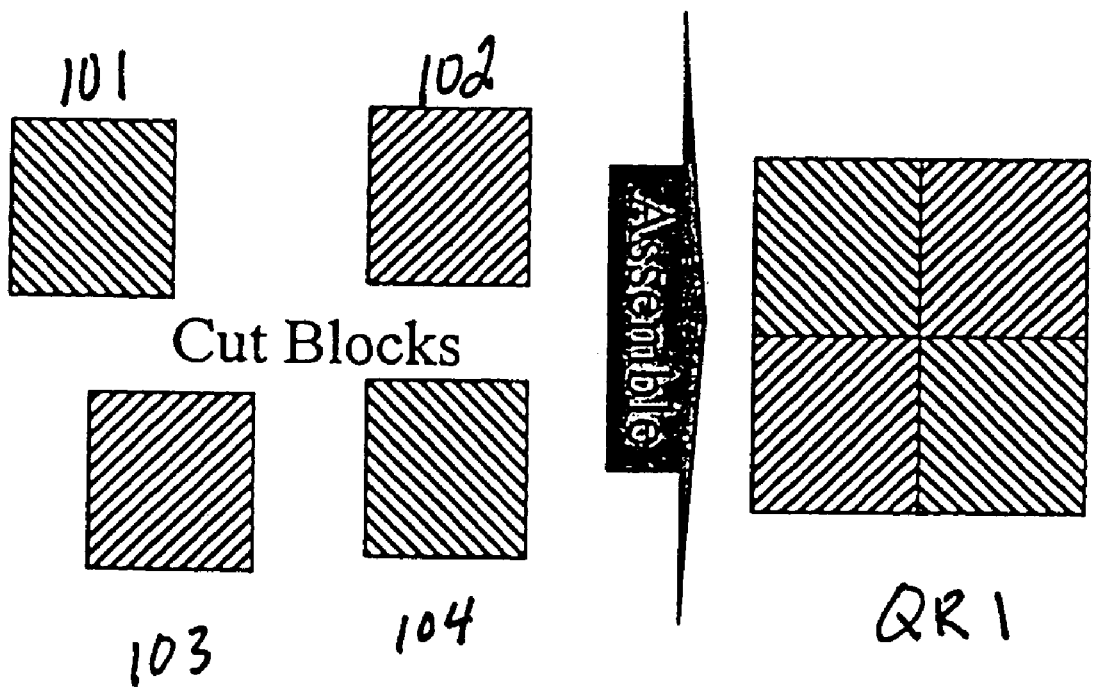

PATTERNING AN OPTICAL PROPERTY ON AN OPTICAL ELEMENT

BACKGROUND OF THE INVENTION

1. Technical Field

The invention relates generally to patterning an optical property on optical elements.

2. Background Art

The ability to pattern an optical property on an optical element is important for high performance optical products. One such property, birefringence, or double refraction, is a phenomenon that occurs in materials characterized by two indices of refraction. Typically, birefringent materials are optically anisotropic substances, examples of which are calcite and quartz. However, some optically isotropic materials, such as glass and plastic, become birefringent when subjected to stress. When a beam of light enters a birefringent material, the beam splits into two polarized rays traveling at different velocities, corresponding to two different angles of refraction. One ray, called an ordinary ray, is characterized by an index of refraction that is the same in all directions. The second ray, called an extraordinary ray, travels with different speeds in different directions and hence is characterized by an index of refraction that varies with the direction of propagation. If the light entering th e birefringent material is unpolarized or linearly polarized, the ordinary and extraordinary rays will have the same velocity along one direction, called the optic axis.

Controlling the pattern of birefringence in a given optical element is useful for many applications. For example, there recently has been an increasing need for signal carrying capacity of optical fibers used by the telecommunications industry. Traditional methods for boosting capacity of fiber communications lines have required either increasing the number of carrier fibers or increasing the transmission rates. Increasing the number of fibers is costly, while the transmission rate for communication systems is limited by existing technology. An alternative approach, based on the use of optical circulator devices, offers a way to double the communication capacity of each single fiber without upgrading equipment or adding new fibers. Application of optical circulators allows bidirectional, full-duplex communication on a single fiber. Polarization-insensitive optical circulators are finding increased use in a broad variety of applications, including optical amplifiers, optical add and drop systems, dense-wavelength-division-multiplexing (DWDM) networks, optical time domain reflectometers (OTDRs), and instrumentation. Polarization-insensitive optical circulators are passive devices that steer optical signal flow from port to port in one direction only, thereby preventing signals from propagating in unintended directions. Unlike "splitters, " which incrementally add losses for each splitter used, optical circulators are low-loss devices.

Birefringent waveplates are an integral part of many polarization-insensitive optical circulator devices. The birefringent waveplates that are used in polarization-insensitive optical circulators may be fabricated from the birefringent crystals which divide the light into an ordinary ray and an extraordinary ray. Birefringent glasses may also be used in forming birefringent waveplates as seen, for example, in U.S. Pat. Nos. 5,375,012 and 5,627,676, assigned to the assignee of the present invention. A waveplate introduces a phase shift between polarized components of light transmitted through the plate. The waveplate modifies and controls the relative phase of the ordinary and extraordinary ray of the beam. The phase difference φ between the two rays is given by:

$$\phi = +/- [2\pi l(n_e - n_o)/\lambda]$$

where $n_e$ is the refractive index of the extraordinary ray, $n_o$ is the refractive index of the ordinary ray, l is the physical thickness of the plate and λ is the wavelength of the light ray.

A simple waveplate may be a slice cut out of a uniaxial crystal, where the slice is cut so that the optic axis lies in a plane parallel to the face of the plane. Principally, materials such as quartz, mica, and calcite are used to form the waveplate. U.S. Pat. No. 5,375,012, issued to Borrelli et al. (the '012 patent), discloses a waveplate composed of a transparent glass body having a thermally developed separated phase in the glass body, where the thermally developed phase is composed of amorphous or crystalline particles having a high aspect ratio. The particles are oriented and aligned along a common axis, whereby the glass body is rendered birefringent so that polarized components of light transmitted through the glass have a phase shift introduced. The waveplate disclosed in the Borrelli patent uses silver halide particles as the separated phase. Borrelli additionally discloses the use of lead borate glasses and bivalent metal oxide silicate glasses. U.S. Pat. No. 5,627,676, issued to Borrelli et al., discloses a waveplate similar to the example from the '012 patent, but uses copper halide to generate the separate phase.

Orientation of birefringent half-waveplates is a critical feature in the performance of a polarization insensitive optical circulator. In the simplest possible arrangement, two half-waveplates are connected together, one half waveplate oriented to produce a positive light rotation and the other oriented to produce a negative light rotation. A half-waveplate may be defined as a plate of a proper thickness that introduces a phase difference of Π (or 180°) between the ordinary and extraordinary rays. The half-waveplates in the device must have different orientations to control the beam orientation, as shown in prior art FIGS. 1A and 1B. FIG. 1A shows a part of an optical circulator, where a rotator group R1 is composed of two reciprocal rotators (half-waveplates) disposed along the direction of light propagation. A first rotator QR1 is a composite rotator composed of reciprocal rotators QR11 and QR13 that rotate light clockwise by 45° and reciprocal rotators QR12 and QR14 that rotate light counterclockwise by 45°, where QR1 installed in a plane vertical to the direction of the light. A second rotator is a reciprocal clockwise rotator QR2.

FIG. 1B shows a method by which the first rotator group QR1 is manufactured. In FIG. 1B, four separate half-waveplates (101, 102, 103, and 104) are assembled together, using an adhesive to generate the 2×2 array (rotator group Q1) that is shown in FIG. 1A. In this example, blocks 101 and 104 have the same orientation (i.e. they are oriented to produce a rotation of +45°), while blocks 102 and 103 have the same orientation (i.e. they are oriented to produce a rotation of −45°). The difficulty, therefore, in manufacturing these elements arises from the fact that the blocks (101, 102, 103, 104) need to be placed individually and then combined to form the 2×2 array (rotator group QR1). As the complexity of the polarization-insensitive optical circulator increases, the size of the array increases correspondingly to the number of ports in the polarization-insensitive optical circulator. Larger arrays, therefore, are difficult to manufacture using current manufacturing processes.

Polarization-insensitive optical circulators are available in a variety of configurations and performance options. The required number of ports, operating wavelength, polarization sensitivity, port isolation, and mechanical packaging are all variables that influence the choice of optical circulator. These designs, however, usually rely on the assembly of small individual birefringent elements cut from crystalline material. The assembly of these elements is non-trivial. The size of the parts which can be so assembled precludes miniaturization below a certain size because of the difficulty in handling the parts. Additionally, optical circulator designs have traditionally been limited by the shapes into which such individual crystal elements can be cut and assembled (typically stacked blocks). Ideally, the birefringent elements should eliminate the costly and complex assembly steps, allow further miniaturization, allow additional design freedom, and ease the manufacture of high-port-count circulators.

SUMMARY OF THE INVENTION

In one aspect, the invention relates to a method for patterning an optical property on an optical element by applying localized heating to the optical element. In another aspect, the invention relates to a method of patterning an optical property on an optical element by combining pieces of optical element containing the optical property with pieces of optical element without the optical property.

Other aspects and advantages of the invention will be apparent from the following description and the appended claims.

BRIEF DESCRIPTION OF THE DRAWINGS

FIG. 1B illustrates a prior art method of assembling half-waveplates.

DETAILED DESCRIPTION

In order to allow optical systems composed of optical elements to be made smaller and more easily, it is desirable for a manufacturer to have the ability to pattern in desired optical properties. This ability would allow a designer to avoid using multiple small pieces to assemble the system.

One such optical element includes drawn, phase-separated glass, which is a birefringent material that is used to produce waveplates. The birefringence in this type of material is due to the presence of prolate ellipsoids of phase-separated silver/copper halides in the glass. Commonly, either a silver halide, such as silver chloride, or a copper halide, such as copper bromide, are used individually, but mixtures may also be used. The present invention uses the discovery that birefringence in glasses of this type may be eliminated in a bulk fashion above the glass transition temperature of the birefringent material, which is illustrated in Table 1 shown below. Table 1 shows the birefringence of birefringent glass following heating as indicated:

| Temp (° C.) | Time (min) | Birefringence |
|---|---|---|
| 500 | 10 | unchanged |
| 500 | 60 | unchanged |
| 550 | 10 | unchanged |
| 550 | 60 | almost absent |
| 600 | 10 | no longer birefringent |
| 600 | 60 | no longer birefringent |
| 650 | 10 | no longer birefringent |

The birefringent glass used for these experiments is Corning Inc. code 8157 which has been prepared as described in the Borrelli '012 patent. The annealing temperature of the glass is 493° C., and the softening temperature is 634° C. Based on the results of the above table, methods of patterning birefringence into an optical element were explored.

Figure 2:
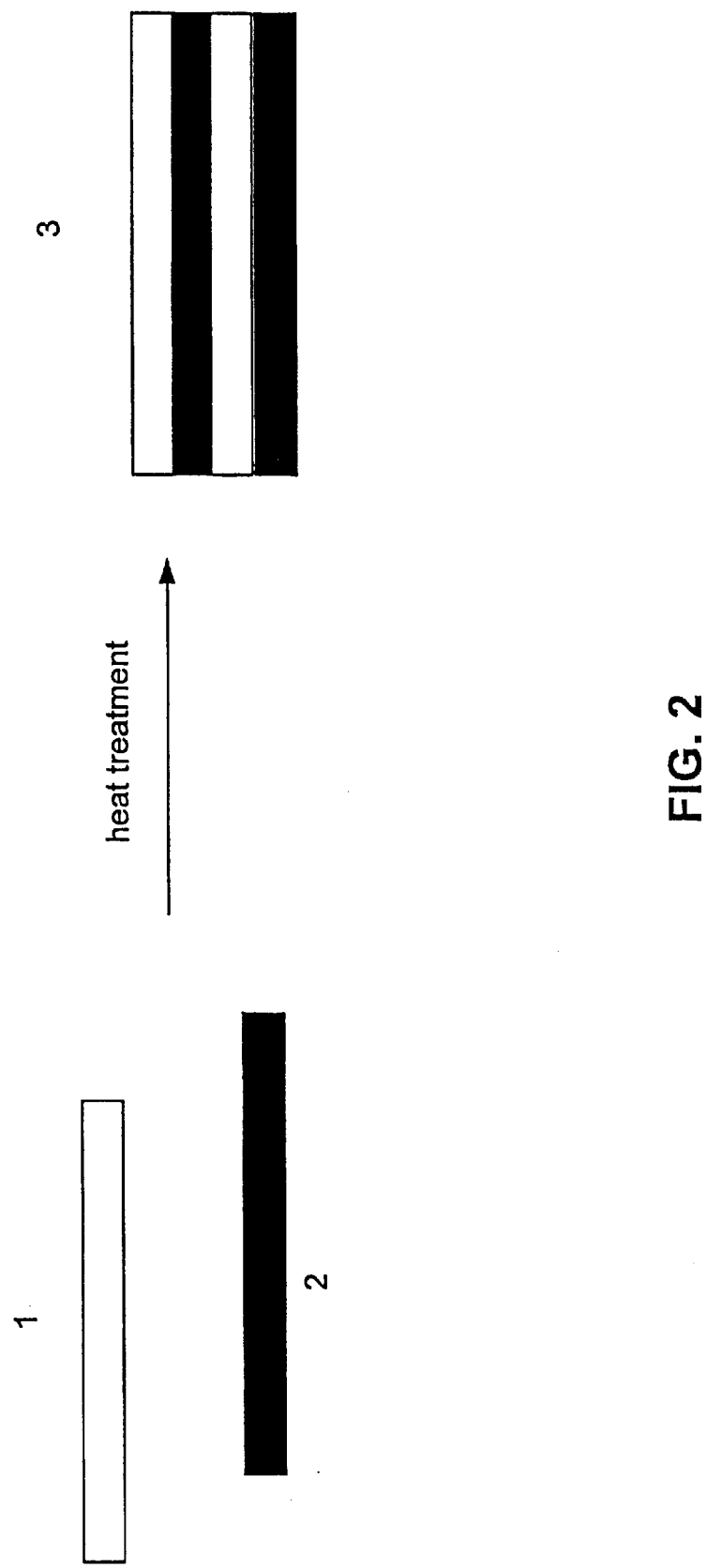
FIG. 2 is a schematic overview of an embodiment of the present invention.

FIG. 2 illustrates an embodiment of one method of patterning an optical property. In FIG. 2, a glass bar 3 was prepared by taking strips of glass with the metal halide additive 1, approximately ½ inch wide, and placing them next to strips of glass without the metal halide additive 2. The separate strips of glass were then heated at a time and temperature sufficient to fuse them and to develop a separate silver/copper halide phase. In order to provide enough length for later draw processing, extension bars (not shown) were fused onto ends of the glass bar 3 during a heat treatment step. After drawing as described in U.S. Pat. No. 5,375,012, the glass making up the rows with halide additive 1 is birefringent, while after drawing the glass making up the rows without the metal halide additive 2 is not. As a result of preparing the glass bar 3 in the above manner, the glass bar 3 comprises alternating birefringent and non-birefringent rows, and has been elongated while its width and thickness have been reduced. Thus it can be cut up into many small individual elements with alternating birefringent and non-birefringent rows. The individual elements may be cut to be substantially identical with one another, or may be cut into any desired shape.

Figure 3:
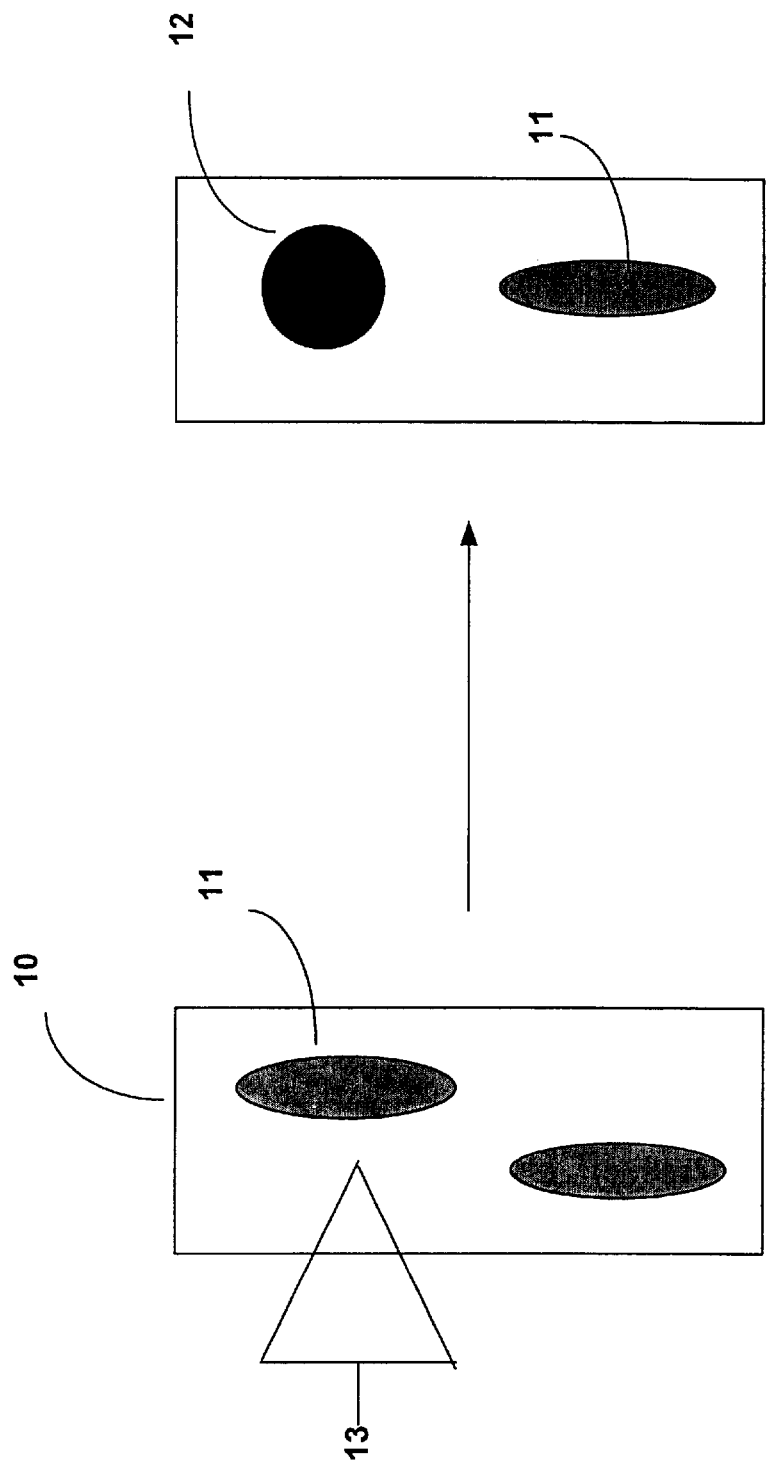
FIG. 3 is a schematic overview of an embodiment of the present invention.

FIG. 3 illustrates another embodiment of the invention. In FIG. 3, a sample of birefringent glass 10 containing ellipsoidal metal halide particles 11 was heated to a temperature of 500° C. in a furnace (not shown). The birefringent glass 10 was then removed from the furnace, and further heated locally, while still at a temperate of 500° C., via a butane/ NO$_x$ torch 13 (sold by Microflame, Inc., as Model 4300) to a temperature of approximately 700° C. for a period of about 5–15 seconds. Localized heating of glass simply refers to heating selected portions of the birefringent material in order to remove the birefringence from the selected portions. The duration of the heating and the temperature of the heating are not critical, so long as the physical characteristics (such as shape, for example) of the birefringent glass 10 do not deteriorate. The duration and temperature are not intended as limitations on the process. The localized heating of the birefringent glass 10 results in the ellipsoidal metal halide particles 11 relaxing to form spheres 12 and eliminating the birefringence from the locally heated regions. FIG. 3 illustrates the relaxation of ellipsoidal metal halide particles 11 to spheres 10.

Figure 4:
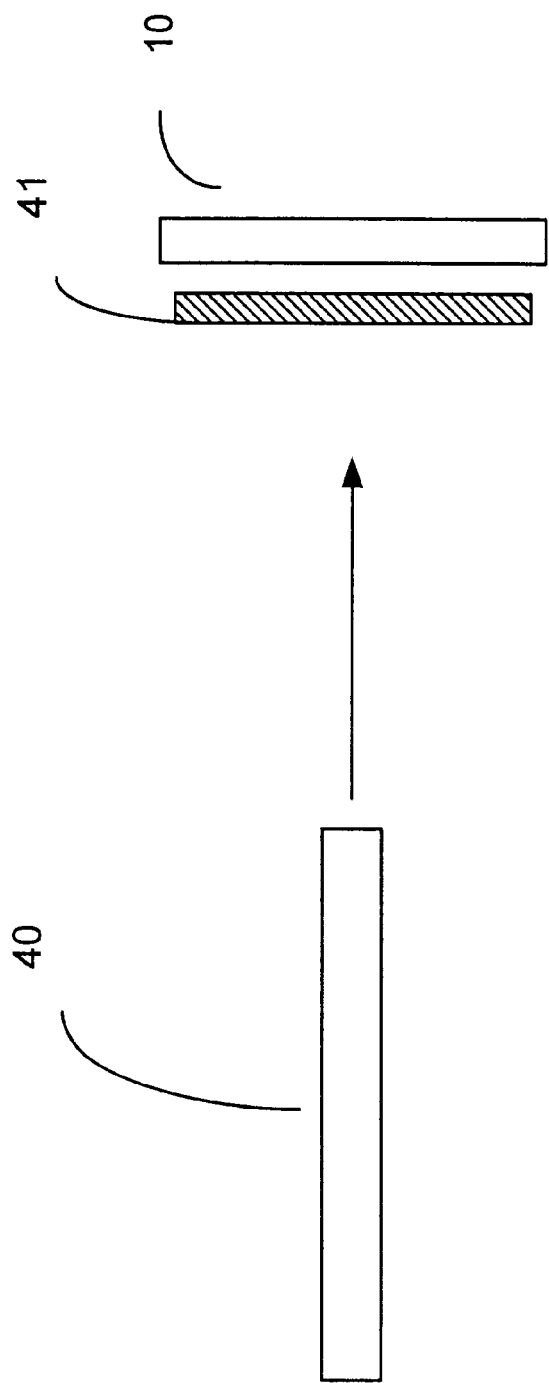
FIG. 4 is a schematic overview of an embodiment of the present invention.

FIG. 4 illustrates another embodiment of the invention. In FIG. 4 a sample of birefringent glass 10 containing ellipsoidal metal halide particles 11 dispersed throughout was heated on a hot plate to a temperature of approximately 375° C. to avoid thermal shock. A $CO_2$ laser 40 operating at a wavelength of 10.6 $\mu$m with a power of approximately 25 to 35 watts when operated at 100% duty cycle was used as a heat source. The power delivered to the sample was adjusted by adjusting the duty cycle (i.e., by turning the laser on and off). A steel mask 41, approximately 2 mm thick with precision holes of various sizes drilled therethrough was suspended above the birefringent glass 10 to define the size of the laser beam which struck the birefringent glass 10. In this embodiment, the duty cycle was set to 2 ms on, 10 ms off, and different areas of the sample were exposed to the laser beam. Use of the mask 41 allows control over the shape and size of the non-birefringent regions patterned in the birefringent glass 10. The size of the mask 41, the exposure times, the wavelength of the laser (as long as the laser light is absorbed by the glass), and the temperature of pre-heating are not important to the results, and, therefore, are not intended to be limitations on the process.

Figure 5:
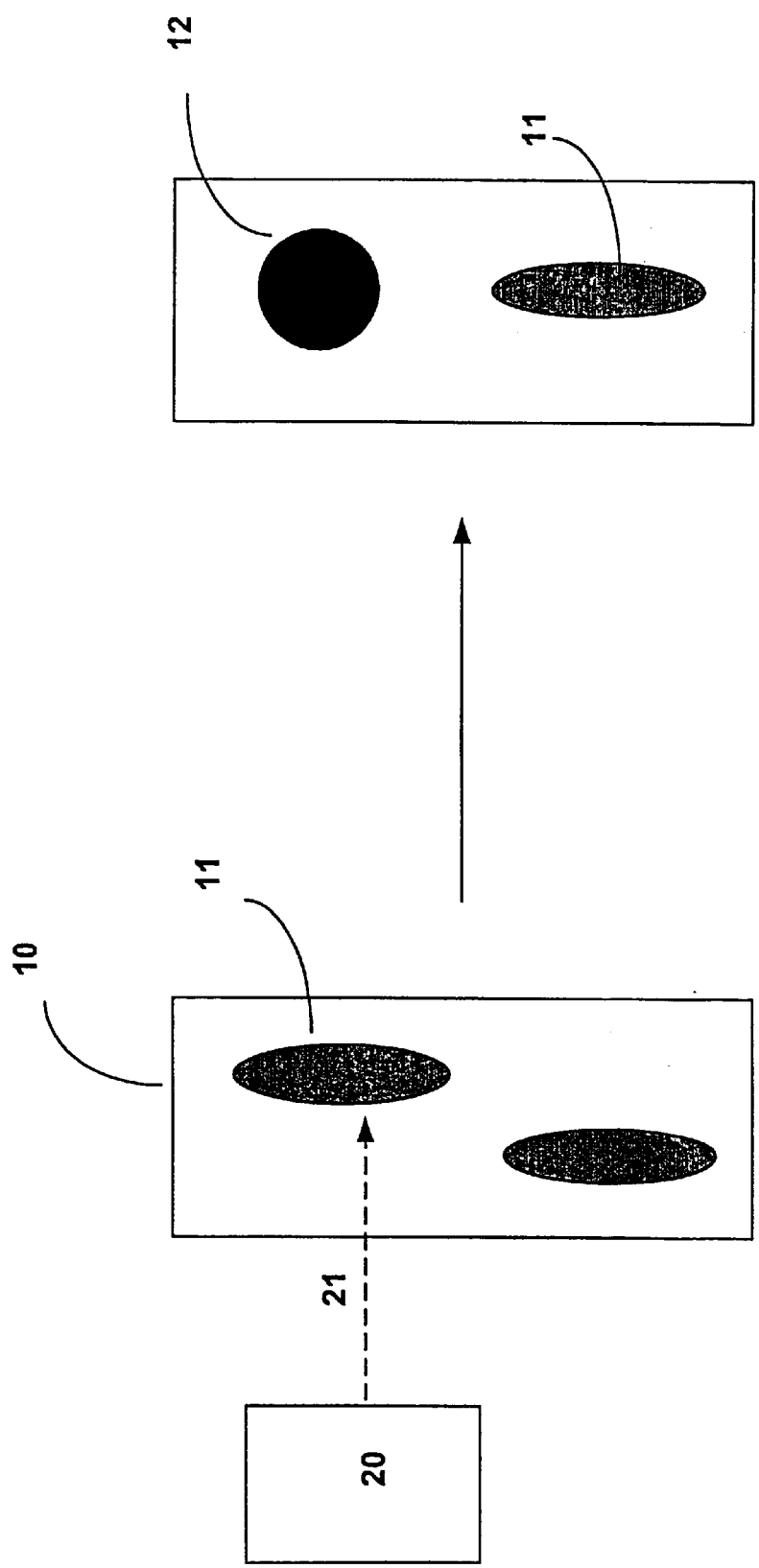
FIG. 5 is a schematic overview of an embodiment of the present invention.

FIG. 5 illustrates another embodiment of the invention. In FIG. 5 a sample of birefringent glass 10 containing ellipsoidal metal halide particles 11 dispersed throughout the material was exposed to an electron beam 21 generated by a modified scanning electron microscope (SEM) 20. A pattern, 1 mm long by 250 $\mu$m wide, was written using single-pass lines on a pitch of 0.6 $\mu$m at a charge density of 300 nC/cm. Following this treatment, the region that had been exposed to the electron beam 21 was found to be markedly less birefringent.

Figure 1A:
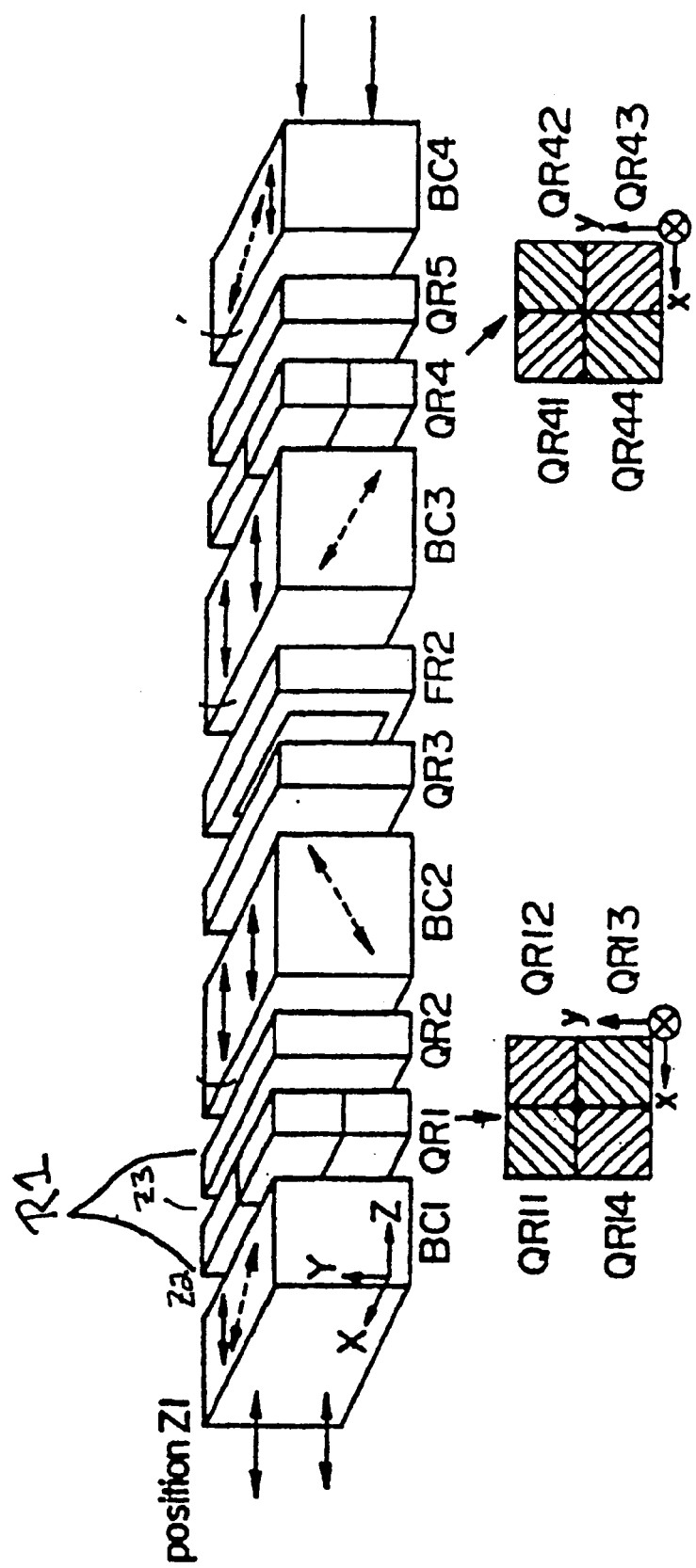
FIG. 1A illustrates a prior art optical circulator.
Figure 6:
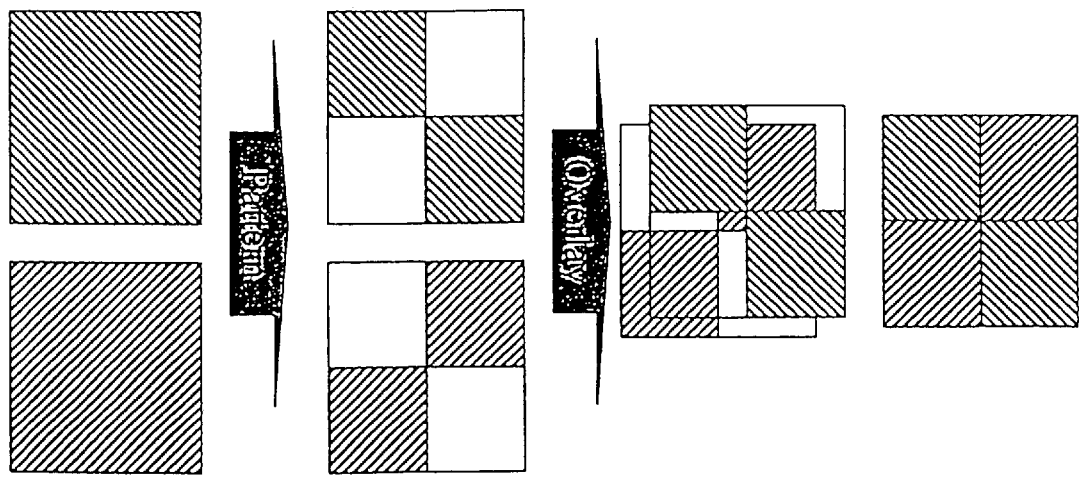
FIG. 6 shows one method of assembling half-waveplates in accordance with an embodiment of the present invention.

The present invention provides a fast and simple way to pattern a desired optical property into an optical element. Traditional methods of patterning optical properties, such as physically arranging individual optical elements, are both expensive and difficult. FIG. 6 gives an example of one advantage of an embodiment of the present invention. FIG. 6 is a schematic of how to generate a 2×2 array using two patterned waveplates 201 and 202 rather than four individual waveplates as shown in FIG. 1B. The patterned waveplate 201 contains two regions, which are illustrated by blank squares, in which the birefringence has been removed. The patterned waveplate 202 also contains two regions in which the birefringence has been removed. The waveplates 201 and 202 can then be aligned such that the regions overlap to give the desired 2×2 array, having a pattern similar to that shown in FIG. 1B.

The present invention allows for significant automation in the patterning process, thus reducing manufacturing expenses. Additionally, the flexibility of the method and the precision to which the optical property can be patterned allows the manufacturer additional freedom in determining the overall layout of an optical element.

Patterning an optical property into an optical element may also be useful in many other applications that use non-reciprocal devices such as the optical circulator mentioned above. The present invention may also relate to optical isolators and other devices that rely on controlling the angle of beam propagation.

Those skilled in the art will appreciate that other embodiments of the invention can be devised which do not depart from the spirit of the invention as disclosed herein. Accordingly, the scope of the invention should be limited only by the attached claims.

What is claimed is:

1. A method of patterning an optical property on an optical element, comprising:

selectively applying an energy source in a localized manner to an optical element to pattern an optical property thereon, the optical element having metal halide particles dispersed therein;

wherein applying the energy source comprises heating a selected portion of the optical element with sufficient energy for the metal halide particles in the selected portion to relax in shape;

wherein the optical property is birefringence.

2. The method of claim 3, wherein the metal halide particles are copper halide.

3. A method of patterning an optical property on an optical element, comprising:

selectively applying an energy source in a localized manner to an optical element to pattern an optical property thereon;

wherein the optical element further comprises metal halide particles dispersed in the optical element;

wherein the metal halide particles are copper bromide.

4. A method of patterning an optical property on an optical element, comprising:

selectively applying an energy source in a localized manner to an optical element to pattern an optical property thereon;

wherein the optical element further comprises metal halide particles dispersed in the optical element;

wherein the metal halide particles are aluminum halide.

5. The method of claim 1, wherein the metal halide particles are silver halide.

6. A method of patterning an optical property on an optical element, comprising:

selectively applying an energy source in a localized manner to an optical element to pattern an optical property thereon;

wherein the optical element further comprises metal halide particles dispersed in the optical element;

wherein a mixture of copper halide and silver halide are dispersed in the optical element.

7. The method of claim 1, further comprising preheating the optical element to a predetermined temperature prior to heating the selected portion of the optical element with sufficient energy for the metal halide particles to relax in shape.

8. A method of patterning an optical property on an optical element, comprising:

selectively applying an energy source in a localized manner to an optical element to pattern an optical property thereon;

wherein the optical element further comprises metal halide particles dispersed in the optical element;

wherein applying an energy source in a localized manner comprises preheating the optical element and heating a small region of the optical element with sufficient energy for the metal halide particles to relax in shape;

wherein the small region is heated with a gas-burning torch.

9. The method of claim 7, wherein preheating the optical element to a predetermined temperature comprises heating the optical element to a temperature below a glass transition temperature of the optical element to prevent thermal shock when selectively applying the energy source.

10. A method of patterning an optical property on an optical element, comprising:

selectively applying an energy source in a localized manner to an optical element to pattern an optical property thereon;

wherein the optical element further comprises metal halide particles dispersed in the optical element;

wherein applying an energy source in a localized manner comprises preheating the optical element and heating a small region of the optical element with sufficient energy for the metal halide particles to relax in shape;

wherein the small region is heated with a laser.

11. The method of claim 10, further comprising placing a steel mask with holes drilled therethrough between the laser and the optical element.

12. A method of patterning an optical property on an optical element, comprising:

selectively applying an energy source in a localized manner to an optical element to pattern an optical property thereon;

wherein the optical element further comprises metal halide particles dispersed in the optical element;

wherein applying an energy source in a localized manner comprises preheating the optical element, heating a small region of the optical element with sufficient energy for the metal halide particles to relax in shape;

wherein the small region is heated with an electron beam.

13. A method of patterning an optical property on an optical element comprising:

fusing pieces of optical element potentially containing the desired optical property with pieces of optical element without a potential or with a lesser potential to have the desired optical property by a heat treatment process; and developing the potential for desired optical property by further treatment.

14. The method of claim 13, wherein the pieces of the optical element containing the potential for the desired optical property are bars of glass containing metal halide additive.

15. The method of claim 13, wherein the pieces of the optical element containing the potential for the desired optical property are bars of glass containing phase-separated metal-halide particles.

16. The method of claim 13, wherein the desired optical property is birefringence.

17. The method of claim 13, wherein the metal halide particles comprise copper halide particles.

18. The method of claim 14, wherein the metal halide particles comprise aluminum halide particles.

19. The method of claim 14, wherein the metal halide particles comprise silver halide particles.

20. The method of claim 13, wherein further treatment is phase-separation heat treatment and redraw.

21. A method of patterning birefringence in an optical element comprising:

placing together alternately pieces of glass containing a metal halide with pieces of glass without a metal halide;

fusing the pieces together, to give a fused glass; and drawing the fused glass; and cutting the glass into many small, individual, elements.

22. A method of forming a patterned birefringent element, comprising:

locally applying heat to a birefringent material according to a predetermined pattern so as to locally remove birefringence from the birefringent material, wherein the birefringent material comprises a phase-separated glass, wherein the phase-separated glass comprises metal halide particles.

23. The method of claim 22, wherein the metal halide particles comprise copper halide particles.

24. The method of claim 22, wherein the metal halide particles comprise silver halide particles.

25. The method of claim 22, wherein the metal halide particles comprise aluminum halide particles.

26. A method of forming a patterned birefringent element, comprising:

locally applying heat to a birefringent material according to a predetermined pattern so as to locally remove birefringence from the birefringent material; and preheating the birefringent material prior to locally applying heat to the birefringent material.

27. The method of claim 26, wherein preheating the birefringent material comprises heating the birefringent material to a temperature below a glass transition temperature of the birefringent material.

* * * * *